ns Cited
Young .................................. 260/897
Batiuk et al. ...................... 260/897 B

United States Patent [19]
Kuan et al.

[11] 4,102,855
[45] Jul. 25, 1978

[54] COMPOSITIONS COMPRISING EPDM, E/VA AND POLY-ALPHA-METHYLSTYRENE

[75] Inventors: Tiong Ho Kuan, Akron; John George Sommer, Hudson, both of Ohio

[73] Assignee: The General Tire & Rubber Company, Akron, Ohio

[21] Appl. No.: 857,166

[22] Filed: Dec. 5, 1977

[51] Int. Cl.² ............................................. C08L 23/16
[52] U.S. Cl. ......................... 260/42.33; 260/33.6 AQ; 260/45.9 NC; 260/897 A; 260/897 B
[58] Field of Search ............. 260/897 A, 897 B, 42.33

[56] References Cited

U.S. PATENT DOCUMENTS

| 3,361,850 | 2/1968 | Young | 260/897 |
| 3,941,859 | 3/1976 | Batiuk et al. | 260/897 B |

FOREIGN PATENT DOCUMENTS

1,201,407  8/1970  United Kingdom.

*Primary Examiner*—Carman J. Seccuro

[57] ABSTRACT

Blends of crystalline EPDM rubbery polymers, high m.w. ethylene-vinyl acetate copolymers and polyalphamethyl styrene exhibit good processing characteristics and physical properties. Part of the EVA may be replaced with low m.w. crystalline polyethylene. The addition of reinforcing agents will raise the modulus and other physical properties while still retaining favorable processing characteristics.

18 Claims, No Drawings

COMPOSITIONS COMPRISING EPDM, E/VA AND POLY-ALPHA-METHYLSTYRENE

BACKGROUND OF THE INVENTION

Some automobile or vehicle parts such as fascia or sight shields are made from rubber compositions including EPDM polymers which use glass fibers to obtain high flexural modulus but are rendered deficient in that the surface after injection molding exhibits objectionable trail lines which require sanding before painting caused by the glass fibers which further produces mold and barrel wear to result in serious factory maintenance problems. Even after sanding and painting these trail lines may sometimes be seen.

DISCUSSION OF THE PRIOR ART

U.S. Pat. No. 3,361,850 discloses that the cold flow of EPDM polymers (crystallinity unknown) having a Mooney viscosity of 10 to 100 (ML-4/212° F.) and containing as high as 58% ethylene units can be improved by the addition of up to 5% of a branched polyethylene, PE, having a melt index of about 0.1 to 100, e.g., having a high to relatively high molecular weight. In place of the polyethylene it is stated that one can use an ethylene-vinyl acetate copolymer containing up to 3% by weight of vinyl acetate units.

U.S. Pat. No. 3,941,859 discloses a thermoplastic blend which does not need curing agents of 100 parts EPDM (having unstretched crystallinity and from 65–85% ethylene units), 5–400 parts PE (low melt index or high molecular weight) and 5–300 parts (low melt index) ethylene-vinyl acetate copolymer containing about 10 to about 50% vinyl acetate. The blend is said to have better tensile strength than could be predicted from the individual effects of the polymeric components alone. While in column 4, lines 11 to 44, it discloses many additives including "phenol-formaldehyde and polystyrene resins," plasticizers and extenders such as esters and oils, it states in column 4, lines 6 to 9 that "the addition of compounding ingredients, particularly waxes, plasticizers and extenders, can detract from the overall tensile strength of the thermoplastic blend." An example showing the use of any polystrene in any amount is not disclosed.

British Pat. No. 1,201,407 discloses an adhesive of a blend of 1–50%, preferably 10–30%, of a homopolymer or copolymer of an olefin and 99–50%, preferably 70–90%, of an ethylene-vinyl acetate copolymer containing 5–25 mole % vinyl acetate units which is at least 60% hydrolyzed. The olefin polymer can be, among a number of others, polyethylene, polypropylene, EPDM, polystyrene, polyalphamethyl styrene, polyvinyl toluene, acrylonitrile-styrene copolymers, butadiene-styrene copolymers and the like and mixtures thereof.

OBJECTS

Accordingly, it is a primary object of the present invention to overcome the difficulties alluded to above and to provide an EPDM composition which is readily processable and on curing exhibits high flexural modulus without the necessity of using any or any appreciable amount of glass fibers and which does not show any or any appreciable trail lines.

Another object of this invention is to provide a cured EPDM composite exhibiting high flexural modulus and other desirable physical properties.

These and other objects and advantages of the present invention will become more apparent to those skilled in the art from the following detailed description and working examples.

SUMMARY OF THE INVENTION

A blend or mixture in certain proportions of a crystalline EPDM rubber, a high molecular weight ethylene-vinyl acetate copolymer and a low molecular weight alpha-methyl styrene polymer will provide processable compositions having good properties. Up to about 50% by weight of the EVA copolymer may be replaced with a low molecular weight crystalline polyethylene with achievement of similar results. Carbon black and clay reinforced vulcanized or cured products of the present invention show physical properties similar to, or better in some respects than, glass filled EPDM products but do not show generally trail lines which need to be sanded, an expensive step. Moreover, the products of the present-invention are generally isotropic rather than being anisotropic which is usually a characteristic of the glass filled EPDM products. Isotropic products provide more uniform shrinkage on cooling after hot molding, thus reducing distortion.

The novel invention disclosed here is believed to involve blending EPDM with more than two polymers, one of which has a chemical structure distinctively different from the rest and hence may be considered incompatible thermodynamically. The incompatibility allows for phase separation to occur and the incompatible polymer has thermal transitions very different from the other polymers. At normal service temperatures, the dispersed or incompatible polymer raises modulus and toughness of the composition. At temperatures above its melting or softening point, the rigid phase decreases significantly in viscosity, imparting a plasticizing effect which is desirable for processing.

DISCUSSION OF DETAILS AND PREFERRED EMBODIMENTS

The curable or vulcanizable EPDM polymer (ethylene-propylene-diene monomer rubbery or elastomeric co or terpolymers) should have an uncompounded or raw Mooney viscosity ML (1+4) at 121.1° C. of from about 25 to 100, preferably from about 25 to 35, a crystallinity at room temperature without stretch of from about 1.5% to about 16%, preferably from about 4.5 to 13%, and an ethylene content of at least about 65 mole %, preferably at least about 75 mole %, the balance of the terpolymer being derived from propylene and a minor amount (not over about 10%, usually not over about 5%) of a diene preferably a non-conjugated diene. The non-conjugated diene can be any one or more of those generally known to the art but preferably is 1,4-hexadiene, ethylidene norbornene or dicyclopentadiene. Very minor amounts of other copolymerized monomers such as hexene, butene and so forth may be present so long as they do not adversely affect the properties of the EPDM, and the diene comonomer can comprise a mixture of dienes as is well known to those skilled in the art. Blends of EPDM terpolymers can be used. The EPDM terpolymer blends can include EPDM rubbery terpolymers which have high or low Mooney viscosities, which are crystalline or amorphous, and which have high or low crystalline contents so long as the blend of the EPDM rubbery terpolymers falls within the definition set forth above. Rubbery or elastomeric EPDM terpolymers, methods for making them and methods for curing them are known as shown by "Rubber Chemistry And Technology," Volume 45, No. 1, March, 1972, Division of Rubber Chemistry, Inc., American Chemical Society, pages 709 to 881; "Rubber Technology," 2nd Ed., Morton, Van Nostrand Reinhold Company, New York, 1973, Chapter 9; "Polymer Chemistry of Synthetic Elastomers," Part II, High Polymer Series, Vol. 23, John Wiley & Sons Inc., New York, 1969, Chapter 7; "Encyclopedia Of Polymer Science And Technology," Interscience Publishers a division of John Wiley & Sons, Inc., New York, Vol. 6 (1967) pages 367–8 and Vol. 5 (1966) page 414; "Encyclopedia Of Chemical Technology," Kirk-Othmer, Interscience Publishers Div. of John Wiley & Sons, Inc., New York, 2nd Ed. (1965) Vol. 17, pages 575–576 and 2nd Ed. (1965) Vol. 7, pages 686 to 693; "The Elastomers Manual," International Institute of Synthetic Rubber Producers, Inc., New York, 1974 Edition; and "Types Of Nordel Hydrocarbon Rubber," Bedwell, pamphlet NOR-101, 1974, E.I. du Pont de Nemours and Company, Wilmington, Delaware.

The ethylene-vinyl acetate copolymers which can be used have from about 2 to 15 mol % of vinyl acetate, and, typically, they have from about 25 to 62.5% crystallinity as shown by "Encyclopedia Of Polymer Science And Technology," Vol. 6, 1967, Interscience Publishers a division of John Wiley & Sons, Inc., New York, pages 397–399 and "Ethylene And Its Industrial Derivatives," Miller, Ernest Benn Limited, London, 1969, pages 449–450 and 995. They, also, should have a melt index ASTM D-1238 of from about 0.3 to 20, indicating a high molecular weight (please see U.S. Pat. Nos. 3,215,678 and 3,402,223). Ethylene-vinyl acetate copolymers and methods for making them are well known as shown by said "Encyclopedia Of Polymer Science And Technology;" said "Ethylene And Its Industrial Derivatives;" "Vinyl And Related Polymers," Schildknecht, 1952, John Wiley & Sons, Inc., New York; and "Polythene," Renfrew and Morgan, Iliffe & Sons Limited, London, 1960.

The solid polyalpha-methyl styrene should have a number average molecular weight of from about 500 to 1,200. Polyalpha-methyl styrenes and methods for making the same are known and are described in "Encyclopedia Of Polymer Science And Technology," Vol. 13, 1970, Interscience Publishers a division of John Wiley & Sons, Inc., New York; "Vinyl And Related Polymers," Schildknecht, 1952, John Wiley & Sons, Inc., New York; "Styrene," Its Polymers, Copolymers and Derivatives, Boundy and Boyer, ACS Monograph Series, Reinhold Publishing Corporation, New York, 1952; and "Vinyl And Diene Monomers," High Polymers, Vol. XXIV, Wiley-Interscience, A Division of John Wiley & Sons, New York, 1971, pages 554–560.

The polyethylene, PE, used should be a solid, crystalline and have an average molecular weight of from about 6,000 to 15,000. The polyethylene can be a low, medium or high density polyethylene, but preferably it is a low density polyethylene. Polyethylenes and methods for making them are shown by "Polyolefins: Structure and Properties," Boenig, Elsevier Publishing Company, New York, 1966; "Crystalline Olefin Polymers," Part I, High Polymers, Vol. XX, Raff and Doak, Interscience Publishers, John Wiley & Sons, Inc., New York, 1965; "Rubber Technology," 2nd Ed., Morton, Van Nostrand Reinhold Company, New York, 1973, pages 559 to 570; "Crystalline Olefin Polymers," Part II, High Polymers, Vol. XX, Raff and Doak, Interscience Publishers, John Wiley & Sons, Inc., New York, 1964; "Encyclopedia Of Chemical Technology," Kirk-Othmer, Vol. 14, 2nd Ed., 1967, Interscience Publishers Div. of John Wiley & Sons, Inc., New York, pages 219 to 221, 238, 242, 259 to 265 and 275; "Polyethylene," Raff and Allison, Interscience Publishers Inc., New York, 1956, page 234; Brode and Koleske, "J. of Macromolecular Science," A6 (6), 1972, pp. 1109–1114; Baldwin and ver Strate, "Rubber Reviews," Rubber Chem. and Technol. 45, No. 3, 709 (1972); Settig, "Polyolefin Resin Processes," Gulf Publ. Co., Houston, 1961, pages 157 and 202–203; and Eastman Kodak Co. Technical Data Bulletin TDS No. F-170, "Epolene" Waxes, 1968.

The compositions of this invention basically comprise 100 parts by weight of said crystalline EPDM rubber, from about 5 to 30 parts by weight of said crystalline high molecular weight ethylene-vinyl acetate copolymer, and from about 2 to 10 parts by weight of said solid low molecular weight polyalphamethyl styrene. Up to about 50% by weight of said EVA copolymer can be replaced by said low m.w. crystalline PE.

To obtain the best physical properties of the blend of this invention it is compounded with rubber reinforcing fillers or pigments, processing oils and cured using a sulfur curing system.

The finely divided pigments and/or fillers including reinforcing pigments and/or fillers, for example carbon blacks and non-carbon blacks, employed are the ones generally used in compounding rubber in the rubber industry. Thus, there can be used the reinforcing, semi-reinforcing, easy processing, extrusion and high abrasion carbon blacks as well as other blacks. While channel, furnace, acetylene and thermal blacks can be used, it is preferred to employ the furnace blacks, especially the semi-reinforcing and/or fine extrusion blacks. If the final part is to be painted, non-staining blacks should be used. Carbon black and its properties are well known as shown by the "Encyclopedia Of Chemical Technology," Kirk-Othmer, Vol. 4, 2nd Ed., 1964, pages 243–282, Interscience Publishers, a Div. of John Wiley & Sons, Inc., New York. There, also, can be used the hard and soft clays, the silicas and silicates and the calcium carbonates and other non-black type rubber reinforcing pigments/fillers. Examples of these materials are calcium carbonate, calcium sulfate, silica, aluminum silicate, mica, feldspar, aluminum hydroxide, magnesium silicate, barium sulfate, asbestos, Perlite, calcium magnesium silicate, magnesium carbonate, glass microbeads silane treated or untreated, titanium dioxide, and the like. Mixtures of these fillers can be used. The fillers are used in an amount sufficient to obtain the desired viscosity and reinforcement of the composition of the present invention. For example, they may be used in an amount of from about 75 to 250, preferably from about 125 to 215, parts by weight per 100 parts by weight of the crystalline EPDM rubber. Where problems may be encountered regarding loss of paint adhesion due to galvanic action, not over about 30% by weight of total composition should be a carbon black which causes galvanic action, the balance of the filler needed being satisfied by sufficient amounts of one or more of the above non-black fillers or pigments or black fillers which do not cause galvanic action. However, if the black does not cause galvanic action, all of the pigment may be of such a black. U.S. Pat. No. 3,915,928 discloses an EPDM composition containing glass fibers and carbon black and refers to galvanic action.

Processing oils, if desired, may be added to the composition of the present invention to aid in mixing and calendering, to reduce viscosity, and to improve extruding and molding. They also, may be used in part as an extender for the higher Mooney rubbers. Preferred are the naphthenic and paraffinic oils although the aromatic oils, including the highly aromatic oils, may be used if desired. Non-staining oils, also, are preferred. The incorporation and use of processing or extending oils in rubber is well known to the art. See "Plasticizer Technology", Vol. 1, Bruins, 1965, Reinhold Publishing Corp., New York; "India Rubber World," Vol. 126, No. 4, July, 1952, pages 495–499; "Industrial And Engineering Chemistry", May, 1953, pages 1035–1053; ASTM Specification D 2226-70; Sun Oil Company, Industrial Products Department, Technical Bulletin No. 88, "Rubber Process & Extender Oils," 12 pages; "Petroleum Oils For The Chemical Process Industry," Sun Oil Company, Bulletin No. A1-1006, Copyright 1976, 8 pages; and "Materials, Compounding Ingredients, And Machinery For Rubber," 1977, Bill Communications, Inc., New York. The oils may be used in an amount sufficient to obtain the desired degree of processing or extension of the composition or rubber, from 0 to usually not over about 75 parts by weight of oil per 100 parts of the crystalline EPDM rubber. Preferably, there are used from about 5 to 35 parts by weight of the processing oil per 100 parts by weight of the crystalline EPDM rubber. It, also, will be appreciated that the levels of curatives, oil and/or filler may have to be adjusted to get the desired viscosity of the composition to permit proper processing in the Banbury and on mills or calenders. Moreover, adjustment of curatives filler and/or oil level may be necessary to get a viscosity low enough at suitable injection pressures and/or temperatures to provide good material flow and relatively short injection times where injection molding machines are to be used.

Sulfur type curing or vulcanizing systems are best used with the compositions of the present invention, particularly those which are loaded with filler to get high flexural modulus. The type and level of curatives for the sulfur cure system are used in an amount or level necessary to get the desired properties and state of cure with a long enough scorch life to preclude any tendency of the composition to set up in the barrel or manifold of an injection molding machine when molding by injection molding. Also, scorch life should be sufficient to permit processing and compression molding. Sulfur type curatives are disclosed in the references mentioned supra. For example for sulfur curing, there can be used sulfur or sulfur furnishing compounds, zinc oxide, zinc stearate, stearic acid, tetramethylthiuram disulfide, 2-mercaptobenzothiazole, dithiocarbamatethiazole blends, tellurium diethyldithiocarbamate, dipentamethylene thiuram hexasulfide, zinc dimethyldithiocarbamate, zinc salt of 2-mercaptobenzothiazole, tetramethylthiuram monosulfide, tetraethylthiuram disulfide, dipentamethylenethiuram tetrasulfide, benzothiazyl disulfide, zinc diethyldithiocarbamate, zinc dibutyldithiocarbamate, 4,4'-dithiodimorpholine, N-cyclohexyl-2-benzothiazole sulfenamide and the like and mixtures of the same. When non-black stocks are used, color pigments may be used such as phthalocyanine blue, phthalocyanine green and other non-deteriorating color pigments. Antidegradants may also be added such as U-V absorbers, chelators, flame retardants and other antidegradants. Rubber retarders in limited or minor amounts may be used to reduce or eliminate scorch. Retarders are described in "Materials, Compoundng Ingredients, and Machinery For Rubber," Bill Communications, Inc., New York, 1977, pages 64 to 66. An example of a retarder is N-(cyclohexylthio)-phthalimide.

The compositions of the present invention may be mixed in a Banbury, on a rubber mill or in other suitable rubber mixing apparatus. The compositions may be extruded, compression or transfer molded or injection molded and cured using apparatus or equipment, and times and temperatures well known to those skilled in the art. Preferably, all of the ingredients except the sulfur and the accelerators are mixed in a Banbury; then there are added the sulfur and accelerators to the composition on a 2-roll rubber mill to reduce scorching or the initiation of vulcanization. Alternatively, a one or two stage Banbury mixing cycle can be used.

The compositions of this invention can be used in the manufacture of insulation and jacketing for electrical wire and cable and for molded electrical connectors, toys, swim fins, floor mats, conveyor belts, electrical tape, automotive heater hose, molded gasketing, automotive body mounts, automotive fender wells, end caps, radiator hose, automobile tire white sidewalls, garden hose, and caulking compounds. In particular, certain formulations of these compositions can be used for automobile fascia and sight shields. Cured automobile fascia such as grill assemblies should exhibit generally a flexural modulus of about at least 20,000 p.s.i. at room temperature (about 25° C.), a maximum heat sag in the range of about 0.80 in. at 121.1° C., a minimum tear in pounds per linear inch (Die C) of 200, a 100% modulus of 800 to 2,000 p.s.i., a minimum tensile strength of 1,500 p.s.i., and an elongation of at least 150%. Sight shields, however, do not have to be as stiff and may have a flexural modulus of only 5,000 to 10,000 p.s.i. at room temperature, a 100% modulus of at least 900 p.s.i., a tensile strength of at least 2,000 p.s.i. and a minimum elongation of 200%. The compositions of this invention can readily be painted by methods known to the art. Usually prior to painting the surface of the cured composition in order to make it adhere better to the paint, it can be treated by etching or by other means and then spray painted and, if sufficiently conductive, can be electrostatically spray painted.

The following examples will serve to illustrate the present invention with more particularity to those skilled in the art.

EXAMPLE I

The following materials were blended or mixed in a Banbury at about 149° to 177° C., tested for certain properties, then compression mold cured about 190.6° C. for 10 to 15 minutes and further tested. The materials and amounts used and the test data obtained are shown in Table I, below:

TABLE I

| Material | Run No. | 1 | 2 | 3 | 4 | 5 | 6 | 7 |
|---|---|---|---|---|---|---|---|---|
| | | | | Parts By Weight | | | | |
| "Nordel" 2722 | | 80 | 80 | 80 | 80 | 80 | 80 | 80 |

TABLE I-continued

| Run No. | 1 | 2 | 3 | 4 | 5 | 6 | 7 |
|---|---|---|---|---|---|---|---|
| | Parts By Weight | | | | | | |
| "Nordel" 1635 | 10 | 10 | 10 | 10 | 10 | 10 | 10 |
| "Nordel" 1660 | 10 | 10 | 10 | 10 | 10 | 10 | 10 |
| "Alathon" 3130 | 10 | 10 | 10 | 10 | 10 | 10 | 20 |
| "Epolene" C-10 | — | 10 | — | 10 | 10 | 10 | — |
| "Amoco" 18-210 | — | — | 5 | 5 | 5 | 5 | 5 |
| SRF-NS | 40 | 40 | 40 | 40 | 47.5 | 47.5 | 40 |
| FEF | 40 | 40 | 40 | 40 | 47.5 | 47.5 | 40 |
| "Suprex" Clay | 60 | 60 | 60 | 60 | 76 | 76 | 60 |
| "Sunpar" 2280 | 10 | 10 | 10 | 10 | — | 10 | 10 |
| ZnO | 5 | 5 | 5 | 5 | 5 | 5 | 5 |
| Zn Stearate | 1 | 1 | 1 | 1 | 1 | 1 | 1 |
| "Vocol S" | 2.82 | 2.82 | 2.82 | 2.82 | 2.82 | 2.82 | 2.82 |
| "NOBS Special" | 1.75 | 1.75 | 1.75 | 1.75 | 1.75 | 1.75 | 1.75 |
| Sulfur | 2.5 | 2.5 | 2.5 | 2.5 | 2.5 | 2.5 | 2.5 |
| "Santogard PVI" | 0.5 | 0.5 | 0.5 | 0.5 | 0.5 | 0.5 | 0.5 |
| | 273.57 | 283.57 | 278.57 | 288.57 | 309.57 | 319.57 | 288.57 |
| 10 Tests | | | | | | | |
| $t_s$ 15 at 190.5° C., min. | 2.25 | 2.8 | 2.4 | 2.9 | 2.3 | 3.0 | 2.9 |
| Minimum torque at 190.5° C., Uncured (Monsanto Oscillating Disc Rheometer) | 6.9 | 5.0 | 5.7 | 4.7 | 7.1 | 5.5 | 5.5 |
| Flexural Modulus × $10^{-3}$, secant to 0.05" deflection, cured, psi | 17.8 | 18.4 | 18.4 | 18.8 | 34.0 | 24.2 | 20.2 |
| (Instron Machine) MPa | 122.7 | 126.9 | 126.9 | 129.6 | 234.4 | 166.9 | 139.2 |
| 100% Modulus, cured, psi | 1420 | 1230 | 1370 | 1175 | 1560 | 1330 | 1275 |
| MPa | 9.8 | 8.5 | 9.4 | 8.1 | 10.8 | 9.2 | 8.8 |
| Tensile, cured, psi | 2050 | 1950 | 1930 | 1770 | 1870 | 1680 | 1820 |
| MPa | 14.1 | 13.4 | 13.3 | 12.2 | 12.9 | 11.6 | 12.5 |
| % Elongation, Cured | 255 | 290 | 240 | 270 | 170 | 210 | 260 |
| Heat Sag at 121.1° C., cured, in. | 0.5 | 0.8 | 0.5 | 0.6 | 0.3 | 0.56 | 0.55 |
| cm | 1.3 | 2.0 | 1.3 | 1.5 | 0.8 | 1.4 | 1.4 |

The significance of ternary or quaternary polymer blends for fascia applications is shown in the above Example. The compound of Run 1, which is a binary blend of EPDM and EVA has a somewhat less than desirable scorch life. Its secant flexural modulus at 0.05" deflection also appears slightly lower than the glass fiber-filled EPDM commercially available (cured averaging about 19,000 psi) compound. Heat sag and the other tensile properties are acceptable. The addition of PE to the EPDM/EVA blend, the compound of Run 2, has a pronounced and favorable effect on scorch life, compound viscosity and secant flexural modulus but somewhat adversely affects heat resistance as indicated by the higher sag on exposure to 121.1° C.

Substituting PaMS for the PE, the compound of Run 3, reduces heat sag but also reduces scorch life. By blending all four polymers together, Run 6, or by blending EPDM, PaMS with a higher concentration of EVA, Run 7, a preferred combination of scorch life, viscosity, stiffness and heat sag is achieved.

The compound of Run 5, which does not contain oil but contains a higher combined level of carbon black and "Suprex" clay than the compound of Run 4, has a secant flexural modulus of close to 35,000 psi with very little sag on heating. The scorch life is shorter and the compound viscosity is higher than may be desired, but this can be circumvented by the addition of oil as shown by the compound of Run 6.

The compound of Run 7 consists of a ternary blend of EPDM, EVA and PaMS. It contains more EVA than the compound of Run 3. Increasing the level of EVA effectively increases the scorch life and the secant flexural modulus.

If the flexural modulus had been measured based on the tangent at zero strain, the flexural modulus of all the cured compositions, Runs 1 to 7 above, would probably be above 20,000 psi. The tear in pounds per linear inch (Die C) of all of the cured compositions of Runs 1 to 7, above, was above 200.

Cured samples of compositions of Runs 1 to 7 were painted with a standard paint ("Durethane" 200, PPG Industries, Inc.) to ascertain if the substrate will adhere to the paint or discolor it and exposed to the weather in South Florida for 3 months. A control using a commercially available cured glass fiber reinforced EPDM composition, also, was tried. While all of the samples returned were dirty, they were easily cleaned using a specified du Pont washing solution and exhibited good color, gloss retention and adhesion.

Additional samples of the painted cured compositions of Runs 1 to 7 plus the control were subjected to a simulated and accelerated aging test in the laboratory using a carbon arc weather-o-meter. The test condition consisted of cycling between 102 minutes of dry and 18 minutes of wet weathering with the temperature averaging about 60° C. Samples were taken out for observation at increments of 50 to 100 hours of continuous exposure. After 750 hours, all samples including the control exhibited excellent color retention with some loss in glossiness. Paint adhesion in all cases was not affected.

Uncured curable samples of compositions from Runs 6 and 7, above, were compared with the curable glass fiber filled EPDM control and tested in an injection molding machine in a fascia mold designed for the control. The data obtained are shown in Table II, below:

TABLE II

| Injection Molding Data | Control, Glass Fiber Filled EPDM | Run 6 | Run 7 |
|---|---|---|---|
| Manifold Temperatures, ° C. | | | |
| Zone 1 | 87.8 | ~79.4 | 71.1 |
| Zone 2 | 90.6 | ~79.4 | 71.1 |
| Zone 3 | 93.3 | ~82.2 | 71.1 |
| Nozzle Temperature, ° C. | 68.3 | 79.4 | 54.4 |
| Barrel Temperature, ° C. | 127 | 127 | 127 |
| Mold Temperature, ° C. | 185 | 174 | 182 |
| Clamp Pressure, psi | 2500 | 2800 | 2800 |
| Injection Pressure, psi | | | |
| High | 18,500 | 22,000 | 20,000 |
| Low | 13,500 | 14,000 | 14,000 |
| Injection Time, seconds | 25 | 51 | 45 |
| Cure Time, seconds | 210 | 165 | 170 |

TABLE II-continued

| Injection Molding Data | Control, Glass Fiber Filled EPDM | Run 6 | Run 7 |
|---|---|---|---|
| Shot Size, inches | 8 | 8 9/16 | 8 3/16 |
| Shrinkage on Cooling | | * | * |

*Slightly greater than control

More data on the injection molded cured parts in the fascia mold, the above Control and Runs 6 and 7, are shown in Table III, below, where a number less than 5 shows results better than the control while a number greater than 5 shows results which are less desirable:

TABLE III

| Parameters | Above Control | Run 6 | Run 7 |
|---|---|---|---|
| Hot Tear | 5 | 3 | 3 |
| Demolding | 5 | 3 | 3 |
| Scorch | 5 | 6 | 4 |
| Trail Lines | 5 | 2 | 2 |
| Residence Time | 5 | 6 | 5 |
| Part Distortion | 5 | 4 | 4 |
| Injection Pressure | 5 | 6 | 5 |
| Knit Lines | 5 | 4 | 4 |
| Trim | 5 | 5 | 5 |
| Class A Sanding | 5 | 4 | 4 |
| Paint Rack Distortion | 5 | 5 | 5 |
| Overall Surface Appearance | 5 | 4 | 4 |
| Conductivity | 5 | 5 | 5 |
| Stiffness | 5 | 4 | 5 |

Improvement in scorch life and crosslinking efficiency (as indicated by the equilibrium torque on curing) of compositions of Runs 6 and 7, above, can be achieved by altering the accelerator system. Combining "Santocure NS" and/or "Vulkacit DZ" with "Vocol S", either with or without "NOBS Special" yielded compounds of long scorch life ($t_s$ −15 as long as 3 minutes) and cure time of between 5 and 6 minutes at 190.6° C. Results indicate that partial or complete replacement of "Suprex" clay with "Austin Black 325" yielded similar EPDM fascia compounds such as Runs 6 and 7 of comparable modulus without sacrificing scorch life. Total replacement of the clay with the Austin black in such compounds can reduce the specific gravity of the compounds or compositions by 10% or more.

EXAMPLE II

Various blends (gums, no fillers nor curatives) were made of the principal components, molded, and then given a visual and microscopic examination. The blends were on a part by weight basis as shown below:

| Blend | A | B | C |
|---|---|---|---|
| "Nordel" 2722 | 80 | 80 | 80 |
| "Nordel" 1635 | 10 | 10 | 10 |
| "Nordel" 1660 | 10 | 10 | 10 |
| "Amoco" 18-210 | 5 | — | 5 |
| "Epolene" C-10 | — | 10 | 10 |
| "Alathon" 3130 | — | 10 | 10 |

Incompatibility between PαMS and the EPDM(s) was indicated by the opacity of the blends when the blends (EPDM/pαMS and EPDM/PαMS/PE/EVA) were observed at a temperature higher than the melting point of the PE in the PE-containing polymers and higher than the softening point of the PαMS as shown below in comparison with other blends.

| | COMPARISON OF BLENDS | | |
|---|---|---|---|
| | A EPDM/PαMS | B EPDM/PE/EVA | C EPDM/PαMS/ PE/EVA |
| Observation at Room Temp. | Opaque | Opaque | Opaque |
| Observation above 104° C. | Opaque | Transparent | Opaque |

The EPDM/PE/EVA blend is opaque at room temperature, but becomes transparent when heated above the crystalline melting point of the PE in the different polymers.

Based on Differential Thermal Analysis, both the PE and EVA exhibited relatively broad melting endotherms which peaked at about 92° C and 88° C, respectively. The composition containing the EVA copolymer has better low temperature flexibility because the vinyl acetate in the EVA inhibits crystallization. The concentration of vinyl acetate monomer has a significant influence on the rigidity and flexibility of the EVA over an extended range of temperatures. Both the PE and EVA appear to be compatible with EPDM based on their similarities in solubility parameters. Despite its low molecular weight the PαMS has a high modulus and can be fractured easily during mixing. The actual thermal transitions of the PαMS used were not detected using either DSC or DTA as contrasted to the utility of these techniques in defining properties of PE. In summary, the disclosed invention comprises blending EPDM with two or more plastics to form a composite having improved processing characteristics and physical properties required for fascia and related automotive applications. It is believed that one or more of the plastics should be incompatible so that phase separation into modulus-enhancing domains can occur. It, further, is believed that the significant softening of the plastics during mixing facilitates the incorporation of a high concentration of carbon black and other inorganic fillers to maximize the modulus. A scorch retarder can be added to further extend scorch life if desired.

NOTES

"Nordel" 2722: Ethylene-propylene-diene random terpolymer rubber or elastomer; from about 2 to 11% crystallinity at room temperature without stretch; third monomer is 1,4-hexadiene; specific gravity of 0.85; reported Mooney viscosity ML (1+4) at 121.1° C. of 25; about 87 mole % ethylene based on $C^{13}$ NMR; fast cure; and DSC showed crystallinity. E.I. du Pont de Nemours and Company.

"Nordel" 1635: Ethylene-propylene-diene random terpolymer rubber or elastomer; third monomer is 1,4-hexadiene; specific gravity of 0.85; Mooney viscosity ML (1+4) at 121.1° C. of 35; about 71 mole % ethylene; and fast cure. E.I. du Pont de Nemours and Company.

"Nordel" 1660: Ethylene-propylene-diene random termpolymer rubber or elastomer; third monomer is 1,4-hexadiene; specific gravity of 0.85; Mooney viscosity ML (1+4) at 121.1° C. of 60; about 71.4 mole % of ethylene; and faster than normal cure. E.I. du Pont de Nemours and Company.

"Alathon" 3130: Ethylene-vinyl acetate copolymer (12 weight % of vinyl acetate); reported density of 0.94 gm/cc ASTM D-792-60T; melt index 2.5 ASTM D-1238; stiffness 9,000 psi ASTM D-747; Vicat softening point 68° C. ASTM D-1525; ultimate tensile strength 2,800 psi ASTM D-638; Elongation 700% ASTM D-638; Shore A hardness 95 ASTM D-1706; Dimattia Flex (cycles to ½" slit cut growth) 18,000 ASTM D-813; NBS Abrasion (% of standard) 380 ASTM D-1630; and % compression set 10 days at 25° C. of 49 ASTM D-395. E.I. du Pont de Nemours and Company (Inc.)

"Epolene" C-10: Crystalline polyethylene; reported approx. molecular weight of 8,000; density at 25° C. of 0.906; acid number <0.05; Brookfield viscosity spindle #3, 6 rpm, 9400 c.p.; melt index 190° C. of 2250; ring and ball softening point of 140° C.; and DTA, Differential Thermal Analysis, using a heating rate of 20° C./min. from liquid nitrogen temperature up to 170° C. showed crystallinity. Eastman Kodak Company.

"Amoco" 18-10: Poly alpha methyl styrene resin. Reported molecular weight, Mechrolab or Menzies Wt. at 15.6° C., of 685; softening point of 98.9° C. ASTM D36; specific gravity 15.6/15.6° C. of 1.075 ASTM D-1298; and refractive index at 20° C. of 1.61. Amoco Chemicals Corporation.

SRF-NS: Finely divided carbon black; semireinforcing furnace, non-staining.

FEF: Finely divided carbon black; fast extrusion furnace.

"Suprex" Clay: Finely divided hydrated aluminum silicate (South Carolina hard clay). J.M. Huber Corp.

"Sunpar" 2280: Paraffinic type oil, ASTM D2226 Type 104 B; reported viscosity SUS at 37.8° C.=2907; density 20/4 of 0.8879; molecular weight of 720; 4% aromatic carbon atoms, 23% naphthenic carbon atoms and 73% paraffinic carbon atoms. Sun Oil Company.

"Vocol S": 62% zinc-O, O-dibutylphosphorodithioate, 38% inorganic silicous carrier, accelerator. Monsanto Co.

"NOBS Special": N-oxydiethylene benzothiazole-2-sulfenamide, accelerator. American Cyanamid Co.

"Santogard PVI": N-(Cyclohexylthio)- phthalamide, scorch retarder. Monsanto Company.

"Santocure NS": N-t-butyl-2-benzothiazole sulfenamide, accelerator. Monsanto Company.

"Vulkacit DZ": Benzothiazyl-2-dicyclohexyl sulfenamide, accelerator. Farbenfab. Bayer AG.

"Austin Black 325" Bituminous fine black. Sp. gr. 1.22. Particle size (Avg. mu) 2.65. Surface area (Avg. M²/g) 12. Produces little or no galvanic action. Slab Fork Coal.

The presence of a melting endotherm above room temperature can be used to determine the crystalline nature of an EPDM polymer. A Perkin Elmer Differential Scanning Calorimeter was used. Differential Scanning Calorimetry spectra of the above "Nordels" 2722, 1635 and 1660 were measured. "Nordel" 2722 had the highest degree of crystallinity as shown by its large melting endotherm. "Nordels" 1660 and 1635, are slightly crystalline, and their degree of crystallinity was found to be very much smaller than "Nordel" 2722.

To calculate the degree of crystallinity, the area under the endotherm is measured using a planimeter (see Perkin Elmer's DSC 1B Instruction Manual, Nov. 1966). This area, when multiplied by a constant supplied by the instrument manufacturer (see said Manual), will give the heat of fusion of the EPDM polymer in units of calories/gram. The heat of fusion of the EPDM polymer is then compared with that of a theoretical 100% crystalline material (polyethylene). Polyethylene is used as the reference since it is assumed that the crystallinity of the EPDM is derived mainly from the ethylene sequences. Thus:

$$\% \text{ crystallinity} = \frac{\text{Heat of fusion of EPDM sample}}{\text{Heat of fusion of 100\% crystalline PE}} \times 100$$

The heat of fusion of a theoretical 100% crystalline polyethylene is available from the literature. Wunderlich and Cormier, Journal of Poly. Science, A-2, 5, 987, 1967, reported a value of 68.4 cals./gram.

The heat of fusion of "Nordel" 2722 EPDM polymer samples, measured at different times using samples taken from different lots, ranged from about 1.4 to 7.2 cals/gram. In terms of degree of crystallinity, these correspond to from about 2 to 11% crystallinity.

On the other hand "Nordels" 1660 and 1635 EPDM polymers have less than 1% crystallinity or less than 1 cal/gram of fusion energy and can be considered as relatively or essentially non-crystalline.

The embodiments of the invention in which an exclusive property or privilege is claimed are defined as follows:

1. A curable processable composition comprising a blend of 100 parts by weight of an ethylene-propylene-diene rubbery polymer (EPDM) having a raw Mooney viscosity ML (1+4) at 121.1° C. of from about 25 to 100, a crystallinity at room temperature without stretching of from about 1.5 to 16% and an ethylene content of at least about 65 mole %; from about 5 to 30 parts by weight of an ethylene vinyl acetate copolymer having from about 25 to 62.5% crystallinity, from about 2 to 15 mol % of vinyl acetate, and a melt index ASTM D-1238 of from about 0.3 to 20; and from about 2 to 10 parts by weight of solid poly alpha methylstyrene having a number average molecular weight of from about 500 to 1200.

2. A curable processable composition according to claim 1 in which up to about 50% by weight of the ethylene-vinyl acetate copolymer has been replaced with a crystalline solid polyethylene (PE) having an average molecular weight of from about 6,000 to 15,000.

3. A curable processable composition according to claim 1 containing additionally finely divided rubber reinforcing pigments selected from the group consisting of carbon black pigments and non-carbon black pigments and mixtures of the same in an amount of from about 75 to 250 parts by weight, not over about 30% by weight of the composition being a carbon black pigment which causes galvanic action, a processing oil in an amount of from 0 to not over about 75 parts by weight and a sulfur curing system in an amount sufficient to cure said composition.

4. A curable processable composition according to claim 3 in which the EPDM contains at least 75 mole % ethylene and the diene is a non-conjugated diene.

5. A curable processable composition according to claim 2 containing additionally finely divided rubber reinforcing pigments selected from the group consisting of carbon black pigments and non-carbon black pigments and mixtures of the same in an amount of from about 75 to 250 parts by weight, not over about 30% by weight of the composition being a carbon black pigment which causes galvanic action, a processing oil in an amount of from 0 to not over about 75 parts by weight and a sulfur curing system in an amount sufficient to cure said composition.

6. A curable processable composition according to claim 5 in which the EPDM contains at least 75 mole % ethylene, the PE is a low density polyethylene, and the diene is a non-conjugated diene.

7. A curable processable composition according to claim 1 in which said Mooney viscosity of said EPDM is from about 25 to 35 and in which the crystallinity of said EPDM is from about 4.5 to 13%.

8. A curable processable composition according to claim 2 in which said Mooney viscosity of said EPDM is from about 25 to 35 and in which the crystallinity of said EPDM is from about 4.5 to 13%.

9. A curable processable composition according to claim 1 containing a scorch retarder in a minor amount sufficient to at least reduce scorch.

10. A curable processable composition according to claim 2 containing a scorch retarder in a minor amount sufficient at least to reduce scorch.

11. A sulfur cured composition comprising a blend of 100 parts by weight of an ethylene-propylene-diene rubbery polymer (EPDM) having a raw Mooney viscosity ML (1+4) at 121.1° C. of from about 25 to 100, a crystallinity at room temperature without stretching of from about 1.5 to 16% and an ethylene content of at least about 65 mole %; from about 5 to 30 parts by weight of an ethylene-vinyl acetate copolymer having from about 25 to 62.5% crystallinity, from about 2 to 15 mol % of vinyl acetate, and a melt index ASTM D-1238 of from about 0.3 to 20; and from about 2 to 10 parts by weight of solid poly alpha methylstyrene having a number average molecular weight of from about 500 to 1200.

12. A sulfur cured composition according to claim 11 in which up to about 50% by weight of the ethylene-vinyl acetate copolymer has been replaced with a crystalline solid polyethylene (PE) having an average molecular weight of from about 6,000 to 15,000.

13. A sulfur cured composition according to claim 11 containing additionally finely divided rubber reinforcing pigments selected from the group consisting of carbon black pigments and non-carbon black pigments and mixtures of the same in an amount of from about 75 to 250 parts by weight, not over about 30% by weight of the composition being a carbon black pigment which causes galvanic action, and a processing oil in an amount of from 0 to not over about 75 parts by weight.

14. A sulfur cured composition according to claim 13 in which the EPDM contains at least 75 mole % ethylene and the diene is a non-conjugated diene.

15. A sulfur cured composition according to claim 12 containing additionally finely divided rubber reinforcing pigments selected from the group consisting of carbon black pigments and non-carbon black pigments and mixtures of the same in an amount of from about 75 to 250 parts by weight, not over about 30% by weight of the composition being a carbon black pigment which causes galvanic action, and a processing oil in an amount of from 0 to not over about 75 parts by weight.

16. A sulfur cured composition according to claim 15 in which the EPDM contains at least 75 mole % ethylene, the PE is a low density polyethylene, and the diene is a non-conjugated diene.

17. A sulfur cured composition according to claim 11 in which said Mooney viscosity of said EPDM is from about 25 to 35 and in which the crystallinity of said EPDM is from about 4.5 to 13%.

18. A sulfur cured composition according to claim 12 in which said Mooney viscosity of said EPDM is from about 25 to 35 and in which the crystallinity of said EPDM is from about 4.5 to 13%.

* * * * *